United States Patent

Yoshizawa et al.

[11] Patent Number: 5,845,019
[45] Date of Patent: Dec. 1, 1998

[54] IMAGE READER

[75] Inventors: Satoru Yoshizawa, Chofu; Hideharu Tsukagoshi; Osamu Inoue, both of Yokohama, all of Japan

[73] Assignee: Nikon Corporation, Tokyo, Japan

[21] Appl. No.: 768,929

[22] Filed: Dec. 18, 1996

Related U.S. Application Data

[63] Continuation of Ser. No. 361,157, Dec. 21, 1994, abandoned, which is a continuation of Ser. No. 80,236, Jun. 23, 1993, abandoned.

[30]     Foreign Application Priority Data

Aug. 20, 1992   [JP]   Japan .................................. 4-221698

[51] Int. Cl.$^6$ .................................................. G06K 9/70
[52] U.S. Cl. ........................... 382/312; 358/474; 355/57
[58] Field of Search .................................... 382/312, 315, 382/291, 321, 151; 358/451, 474; 355/55, 57, 62, 56

[56]                     References Cited

U.S. PATENT DOCUMENTS

| 2,823,579 | 2/1958 | Fitter | 355/60 |
|---|---|---|---|
| 4,060,322 | 11/1977 | Hirayama et al. | 355/60 |
| 4,272,187 | 6/1981 | Birdsall et al. | 355/56 |
| 4,424,534 | 1/1984 | Nagane | 358/287 |
| 4,557,593 | 12/1985 | Iwanade | 355/57 |
| 4,731,668 | 3/1988 | Satomura et al. | 382/312 |
| 4,740,844 | 4/1988 | Yoshimura | 358/287 |
| 4,771,473 | 9/1988 | Sugiura | 382/47 |
| 5,050,007 | 9/1991 | Akanabe et al. | 358/451 |
| 5,083,216 | 1/1992 | Abuyama | 358/451 |
| 5,136,665 | 8/1992 | Inoue | 382/318 |
| 5,155,776 | 10/1992 | Concannon et al. | 382/65 |
| 5,161,029 | 11/1992 | Yamanishi | 358/296 |
| 5,185,822 | 2/1993 | Miura | 382/65 |
| 5,194,894 | 3/1993 | Nishio | 355/57 |
| 5,237,366 | 8/1993 | Oka et al. | 355/57 |

FOREIGN PATENT DOCUMENTS

| 0202427 | 11/1986 | European Pat. Off. | H04N 1/40 |
|---|---|---|---|
| 3942665 | 6/1990 | Germany | H04N 1/393 |
| 60-1972 | 1/1985 | Japan . | |
| 2-48859 | 2/1990 | Japan . | |

OTHER PUBLICATIONS

Patent Abstracts of Japan, vol. 10, No. 80 (P–441), Mar. 1986.
Patent Abstracts of Japan, vol. 8, No. 226 (E–272), Oct. 1984.
Patent Abstracts of Japan, vol. 11, No. 219 (P–596), Jul. 1987.

*Primary Examiner*—Yon J. Couso
*Attorney, Agent, or Firm*—Shapiro and Shapiro

[57]                     ABSTRACT

A low-cost and small-size image reader incorporating a variable power function. An original document is irradiated with the light from a light source. The light is reflected in a reading position. The reflected light is incident on a mirror block via a fixed mirror. The light incident on the mirror block is deflected by a pair of mirrors. An optical path is thus extended and shortened in its length without taking a space in the horizontal directions of the reader. The mirror block and the lens are provided with driving devices. The mirror block and the lens are moved to adjust a focal point and a magnification.

2 Claims, 6 Drawing Sheets

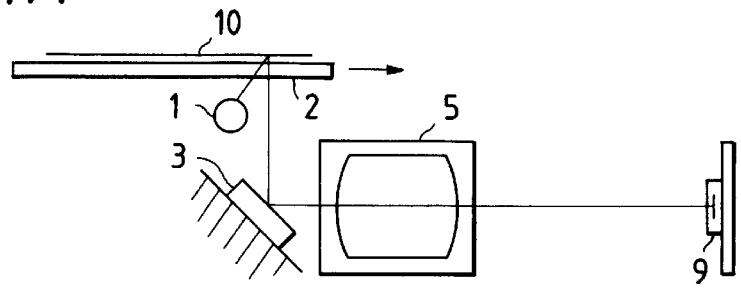
FIG. 1A
FIG. 1B
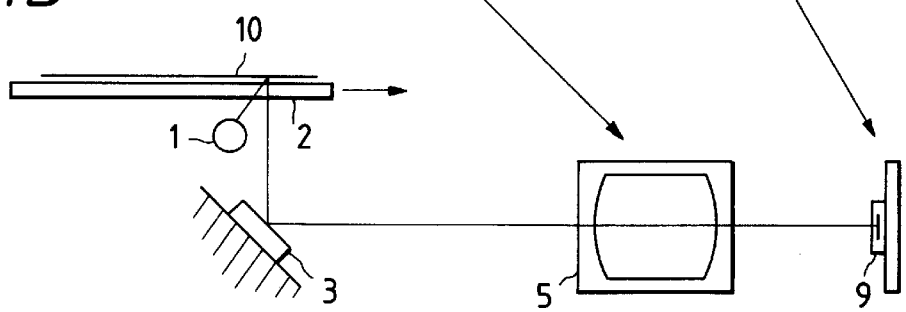
FIG. 2

IMAGE READER

This is a continuation of application Ser. No. 08/361,157 filed Dec. 21, 1994, which is a continuation of application Ser. No. 08/080,236 filed Jun. 23, 1993, both now abandoned.

BACKGROUND OF THE INVENTION

1. Field of the Invention

The present invention relates to an image reader incorporating a variable power function.

2. Related Background Art

In a conventional image reader of a copying machine, a first method of varying a magnification when performing a reading process involves the use of a zoom lens.

Further, a second method involves the use of a fixed focusing lens, wherein the lens and an image reading means are moved for focusing at a desired magnification.

The second method will hereinafter be described with reference to FIGS. 1A and 1B.

To begin with, configurations in FIGS. 1A and 1B will be explained.

Paying attention to FIGS. 1A and 1B, the numeral 10 designates an original document to be read. An original document board 2 is mounted with the original document 10. A light source 1 irradiates the original document 10 with the light. A fixed focusing lens 5 serves to form an image of the original document 10 irradiated with the light from the light source 1. A CCD sensor 9 reads the image formed through the lens 5.

Next, the operation of the reader shown in FIGS. 1A and 1B will be described.

The original document 10 placed on the original document board 2 is irradiated with the light from the light source 1. The light reflected from the original document 10 is deflected at 90° by a fixed mirror 3 and refracted by the lens 5, thereby forming an image on the CCD 9.

Given is an explanation of the method of varying the magnification of the image formed on the CCD 9 in the thus constructed apparatus.

For instance, in the configuration shown in FIG. 1A, the lens 5 and the CCD 9 are moved rightward to obtain a configuration as illustrated in FIG. 1B. The magnification of the image can be thereby increased.

The method of varying the magnification by use of the zoom lens in accordance with the conventional technology described above presents such a problem that the apparatus is expensive because of the zoom lens being expensive. Besides, in the case of an image reader of relatively high grade, sufficient justify use the zoom lens, there exists a limit in terms of varying the magnification.

Furthermore, when increasing the magnification on the basis of the method involving the use of the fixed focusing lens, movement strokes of the lens 5 and the CCD 9 become large. For this reason, a wide space is required in the apparatus. This tends to create to a problem of an increase in size of the apparatus.

SUMMARY OF THE INVENTION

It is a primary object of the present invention to provide a low-cost and small-size image reader incorporating a variable power function in view of the problems inherent in the prior art described above.

To accomplish the forgoing object, according to one aspect of the present invention, there is provided an image reader for reading an image by irradiating an object whose image is to be read with the light from a light source and forming an image of the light reflected from or penetrating the object on a reading sensor through a lens. The image reader has an optical path length changing device for changing a length of an optical path. The optical path length changing device includes two or more optical elements for forming a light deflecting portion in the optical path and a driving device for changing the length of the optical path by shifting the optical elements.

The optical path length changing device is disposed, e.g., in front of the lens and capable of extending and shortening the optical path in terms of its length in front of the lens.

The optical elements incorporating a function to reflect the light are usable. For example, prisms and a plurality of reflectors may be given.

The driving device is capable of incorporating a function to move the whole or a part of the optical elements in such a direction as to change a distance of the light deflecting portion in the optical path. Further, the driving device is also capable of incorporating a function to rotate the whole or a part of the optical elements through such an angle as to change the distance of the light deflecting portion in the optical path.

Moreover, the image reader according to the present invention further comprises a controlling device for controlling the operation of the driving device. This controlling device has a coarse motion mode for effecting rough positioning and a fine motion mode for effecting accurate positioning when shifting the lens and the optical elements. The controlling device is capable of incorporating a function to execute at first the coarse motion mode and subsequently the fine motion mode during the operation.

According to another aspect of the invention, there is provided an image reader for reading an image by irradiating an object whose image is to be read with the light from a light source and forming an image of the light reflected by or penetrating the object on a reading sensor through a lens, the image reader comprising an optical path length changing device for changing a length of an optical path in combination with the lens and a first driving device for moving the lens in the optical-axis directions. The optical path length changing device includes two or more optical elements for forming a light deflecting portion in the optical path and a second driving device for changing the length of the optical path by shifting the optical elements.

The image reader is capable of further comprising a controlling device for controlling the operation of the first and second driving devices. This controlling device has a coarse motion mode for effecting rough positioning and a fine motion mode for effecting accurate positioning when shifting the lens and the optical elements. The controlling device is capable of incorporating a function to execute at first the coarse motion mode and subsequently the fine motion mode during the operation.

The optical path length changing device constitutes the light deflecting portion in the optical path. With the formation of this light deflecting portion, the length of the optical path is larger than in the optical path where the light is not deflected within the same spatial length. Besides, in this state, when the optical elements are shifted, e.g., in the optical-axis directions, a variation in the length of the optical path due to this shift increases corresponding to the light deflection. Hence, the variation in the length of the optical path that is needed when varying the magnification, e.g., an extension of the optical path, can be ensured with a smaller stroke than in the prior art.

Additionally, when including the controlling device for controlling the operations of the first and second driving devices, the controlling device is capable of controlling the operations thereof in cooperation. In this instance, the controlling device is possessed of the coarse motion mode for effecting rough positioning and the fine motion mode for effecting accurate positioning when shifting the lens and the optical elements. The controlling device incorporates the function to execute at first the coarse motion mode and subsequently the fine motion mode during the operation. The lens and the optical element can be shifted at a high velocity, and the magnification can be precisely set.

BRIEF DESCRIPTION OF THE DRAWINGS

FIGS. 1A and 1B are explanatory diagrams showing a conventional image reader which uses a fixed focusing lens;

FIG. 2 is a block diagram illustrating a construction of a first embodiment of the present invention;

DESCRIPTION OF THE PREFERRED EMBODIMENTS

Figure 3:
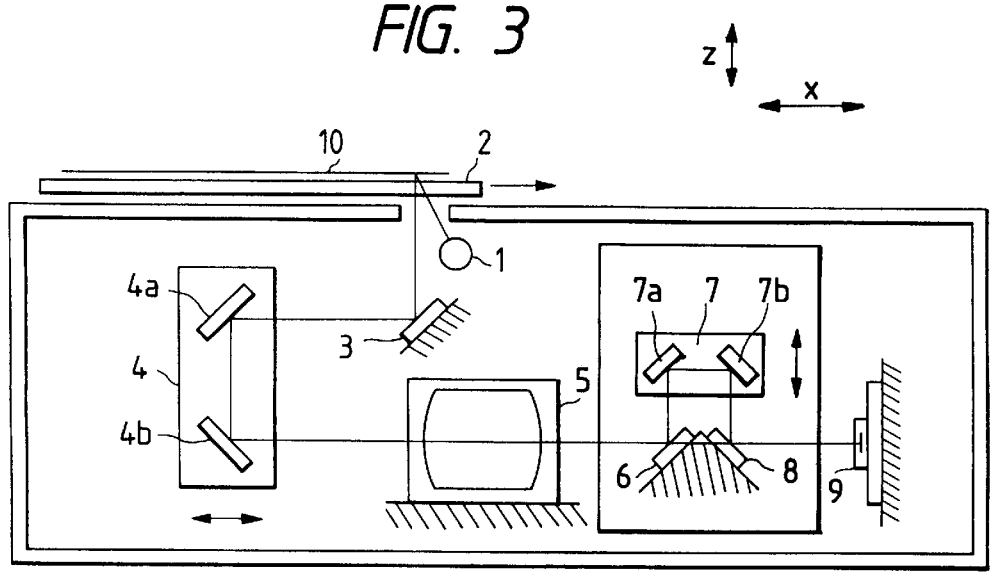
FIG. 3 is a block diagram illustrating a construction of a second embodiment of the present invention.

Embodiments of the present invention will hereinafter be described with reference to the drawings.

FIG. 2 is a block diagram illustrating an optical system of a reader in a first embodiment of the present invention.

Paying attention first to FIG. 2, the optical system of the reader in this embodiment is constructed of a light source 1, an original document board 2, a fixed mirror 3, a mirror block 4, a fixed focusing lens 5 and a CCD sensor 9. An original document 10 is an object to be read by this reader. The symbol 10a represents a reading position of the original document 10.

The original document is irradiated in the reading position 10a with the light from the light source 1.

The original document board 2 mounted with the original document 10 moves in an arrowed direction. With this movement, the reader is capable of line-sequentially reading the original document 10.

The fixed mirror 3 is located on the optical axis of the light reflected from the reading position 10a. The fixed mirror 3 is installed to deflect this light at 90°.

The mirror block 4 consists of a pair of mirrors 4a, 4b. The mirror 4a is disposed in parallel with the mirror 3 on the optical axis of the light deflected by the mirror 3. The mirror 4b is disposed on the optical axis of the light reflected by the mirror 4a to make 90° with respect to the mirror 4a. Further, the mirror block 4 is provided with a driving portion and is thereby movable in the horizontal directions of the reader.

The fixed focusing lens 5 is disposed on the optical axis of the light reflected by the mirror 4b. The fixed focusing lens 5 is provided with a driving portion and is thereby movable in the horizontal directions of the reader. A path of the light reflected by the mirror 4b can be extended and shortened by changing a position of the lens 5.

The positions of the mirror block 4 and the lens 5 may be determined to satisfy the formula of a known lens. For instance, there are prepared plural sets of positions of the mirror block 4 and the lens 5 that meet this formula. Plural kinds of magnifications may be thus provided.

The CCD sensor 9 reads an image formed via the lens 5.

Next, the operation shown in FIG. 2 will be explained.

The light emitted from the light source 1 falls on the reading position 10a of the original document 10 on the original document board 2.

When the user indicates a magnification, the mirror block 4 and the lens 5 are driven by the driving portion to positions obtained by a controlling portion (which will be explained in greater detail referring to FIG. 7).

The light reflected from the reading position 10a is deflected at 90° by means of the fixed mirror 3. This deflected light is incident on the mirror block 4. The light incident on the mirror block 4 is deflected at 90° by the mirror 4a. The optical path is thereby set in the vertical direction of the reader. This light is further deflected at 90° by the mirror 4b. The optical path is thereby set again in the horizontal direction of the reader. This light strikes on the lens 5 to form an image on the CCD 9. Thus, the optical path can be extended without requiring an air space in the horizontal direction of the reader in the mirror block 4. Further, the mirror block 4 and the lens 5 are moved by the driving portions in the horizontal directions of the reader, whereby the optical path can be extended and shortened.

In accordance with this embodiment, the mirrors 4a, 4b of the mirror block 4 constitute a light deflecting portion. When changing the magnification, the mirror block 4 is moved in arrowed directions A shown in FIG. 2. Consequently, it is possible to ensure a variation in the optical path that is twice a movement stroke thereof. Hence, a large variation in the optical path can be attained with a small shift stroke.

Note that the one-staged mirror block is provided in this embodiment, but multi-staged mirror blocks may be provided to increase the number of deflections.

FIG. 3 illustrates a second embodiment of the present invention.

In accordance with the second embodiment, fixed mirrors 6, 8 and a second mirror block 7 are added to the construction of the first embodiment. Further, the lens 5 is fixed.

Then, the outgoing light from the lens 5 is deflected at 90° by the fixed mirror 6 (the deflected optical path is set in the vertical direction of the reader) and falls on the second mirror block 7. The light incident on the mirror block 7 is deflected at 90° by a mirror 7a. The optical path is thereby set in the horizontal direction of the reader. This light is further deflected at 90° by a mirror 7b. The optical path is thereby set again in the vertical direction of the reader. The light is deflected at 90° by the mirror 8 to form an image on the CCD 9.

The light deflecting portions are thus constructed of the mirror blocks 4, 7. The mirror blocks 4, 7 are moved to change the length of the optical path, whereby the magnification can be varied.

Figure 4:
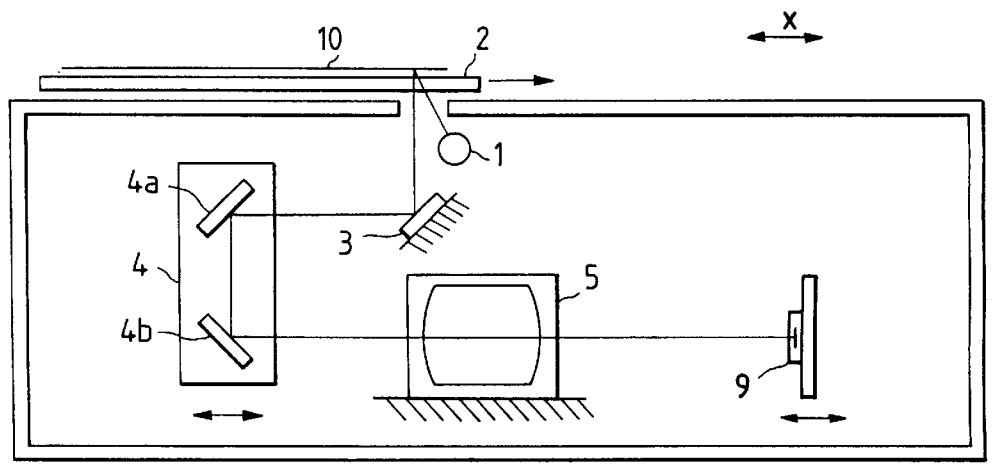
FIG. 4 is a block diagram illustrating a construction of a third embodiment of the present invention.

FIG. 4 shows a third embodiment of the present invention.

A different point of the third embodiment from the first embodiment is that the lens 5 is fixed, and the CCD 9 is movable in the optical-axis directions. The mirror block 4 and the CCD 9 move to make the magnification variable. Other points are the same as those in the first embodiment.

Figure 5:
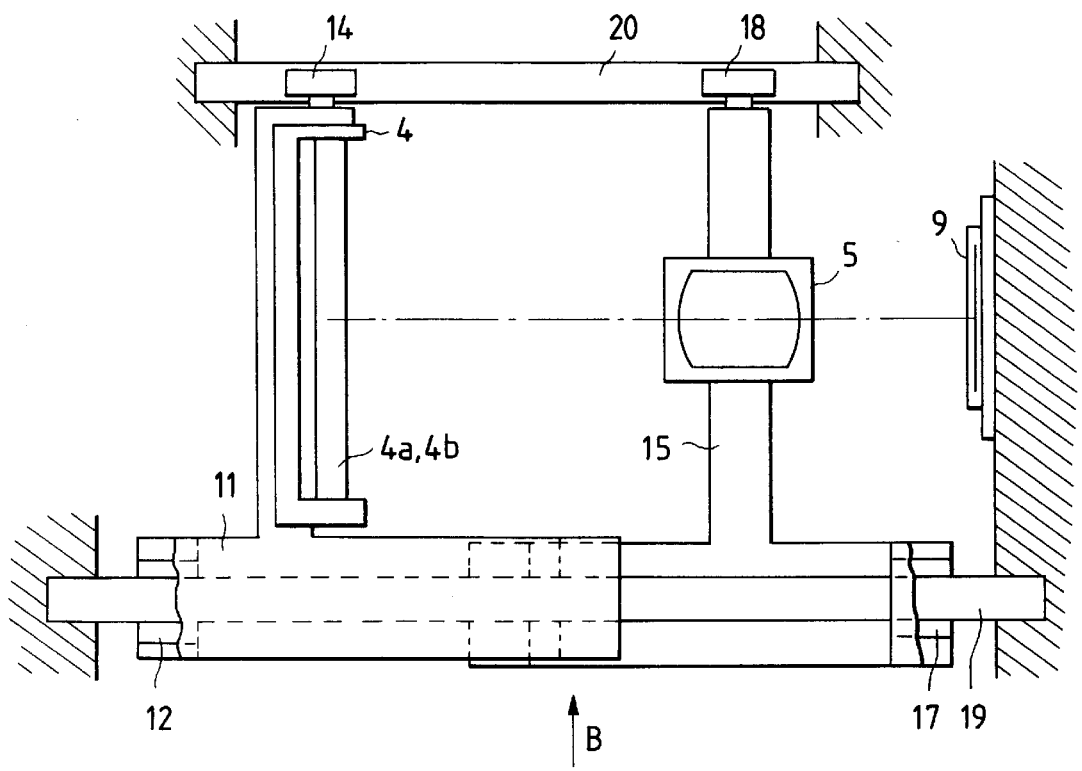
FIG. 5 is a plan view showing an embodiment of a guide mechanism for moving a mirror block 4 and a lens 5 in FIG. 2.
Figure 6:
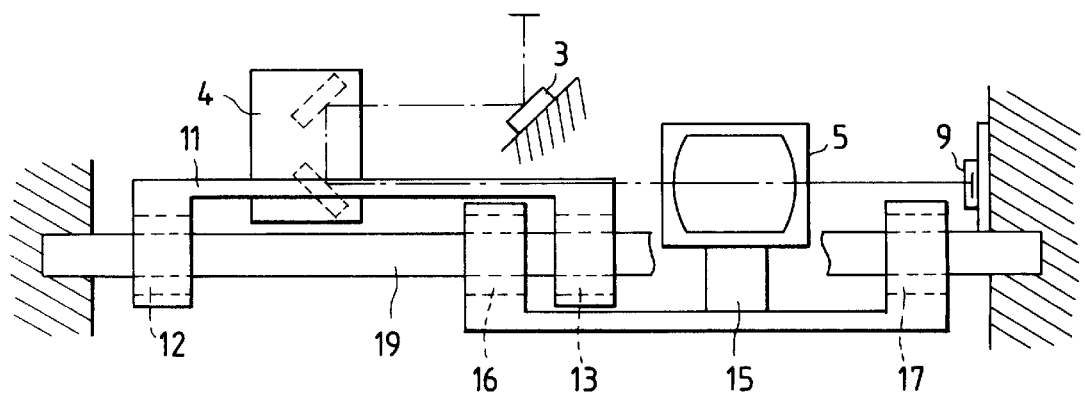
FIG. 6 is a view taken substantially along the arrowed line B in FIG. 5.

FIGS. 5 and 6 are views each illustrating a guide mechanism for moving the mirror block and the lens 5 shown in FIG. 2. FIG. 6 is a view taken substantially along the arrowed line in FIG. 5.

Referring to FIGS. 5 and 6, the guide mechanism is constructed of a mirror stage 11, bushings 12, 13, a radial bearing 14, a lens stage 15, bushings 16, 17, a radial bearing 18 and a guide bar 19.

The mirror stage 11 is mounted with the mirror block 4. The mirror stage 11 is three-point-supported on the bushings 12, 13 and the radial bearing 14.

The lens stage 15 is mounted with the lens 5. The lens stage 15 is three-point-supported on the bushings 16, 17 and the radial bearing 18.

The bushings 12, 13 and the bushings 16, 17 are movably fitted to the exterior of the common guide bar 19 and slide thereon.

The radial bearings 14, 18 roll on a common guide bar 20.

As shown in FIG. 6, the mirror stage 11 and the lens stage 15 move on the guide rail 19 in a complicated form. Hence, spans between the bushings 12, 13 and between the bushings 16, 17 are each set long.

When moving the mirror block 4, the radial bearing 14 rolls on the guide bar 20. Simultaneously, the bushings 12, 13 are slid along the guide bar 19.

When moving the lens 5, the radial bearing 18 rolls on the guide bar 20. Simultaneously, the bushings 16, 17 are slid along the guide bar 19.

Figure 7:
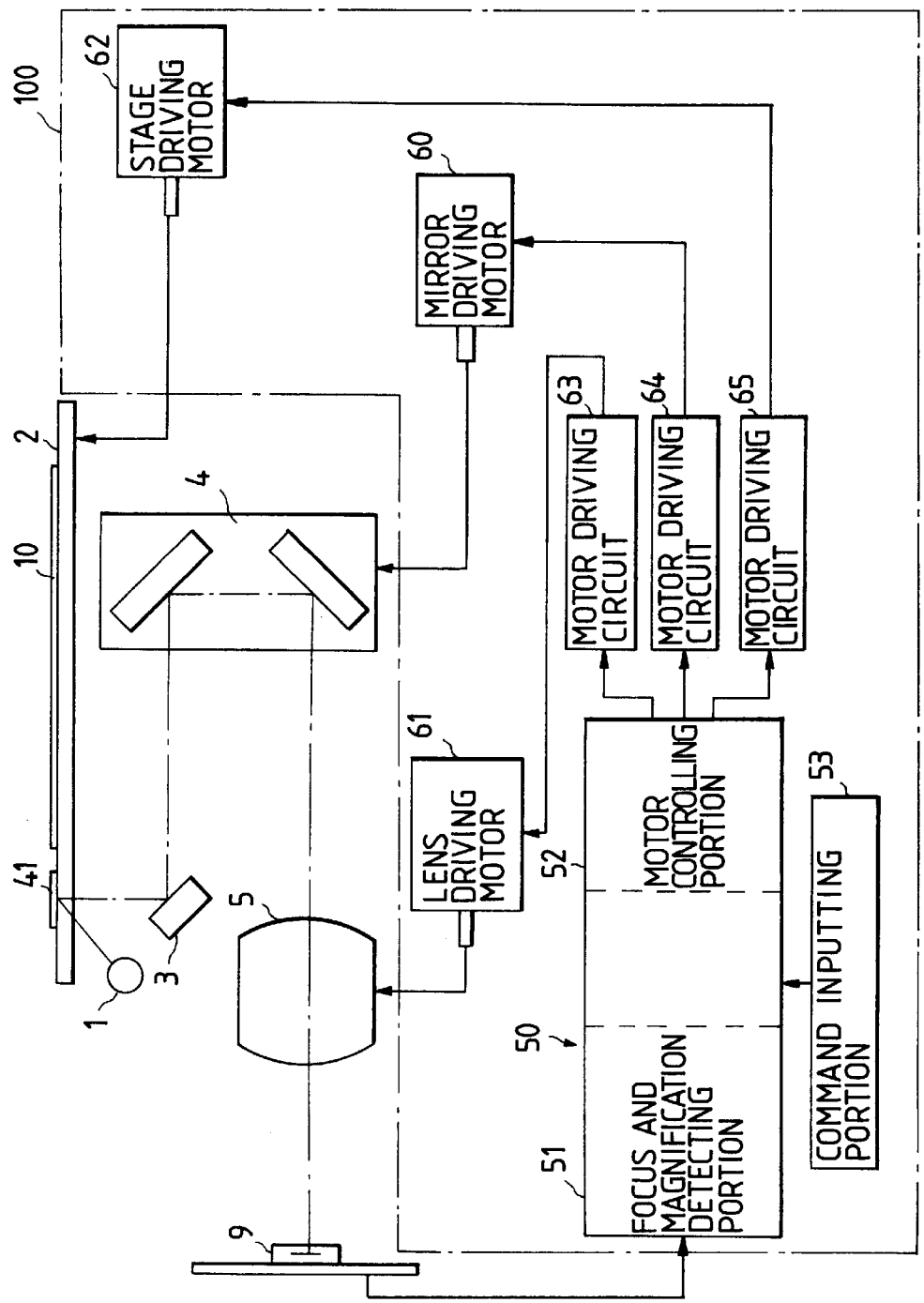
FIG. 7 is a block diagram showing one example of a configuration of a driving system for shifting positions of a stage 2, the mirror block 4 and the lens 5 in FIG. 2.

FIG. 7 is a view showing a driving system 100, for shifting positions of the stage 2, the mirror block 4 and the lens 5, of the image reader shown in FIG. 2.

Turning to FIG. 7, the driving system 100 consists of a mirror driving motor 60, a lens driving motor 61, a stage driving motor 62, motor driving circuits 63 to 65, a CPU 50 functioning as a control unit and a command inputting portion 53. Further, the numeral 41 designates a chart for detecting whether an in-focus state and a desired magnification are obtained or not. The reference numerals 1, 2, 3, 10, 4, 5, 9 represent, as identical with those shown in FIG. 2, the light source, the original document board, the mirror, the original document, the mirror block, the lens and the CCD sensor, respectively.

The mirror driving motor 60 is connected via an unillustrated power transmission mechanism to the mirror block 4, thereby driving the mirror block 4.

The lens driving motor 61 is connected to the lens 5 to drive this lens 5.

The stage driving motor 62 is connected to the original document board 2 mounted with the focus and magnification detecting chart 41, thereby driving the original document board 2.

The lens driving motor 61, the mirror driving motor 60 and the stage driving motor 62 are respectively connected to the motor driving circuits 63 to 65. The motor driving circuits 63 to 65 are connected to and controlled by the CPU 50.

The CPU 50 includes a focus and magnification detecting portion 51 and the motor controlling portion 52. The command inputting portion 53 and the CCD 9 are also connected to the CPU 50. The CPU 50 causes the controlling portion 52 to issue a drive command to the driving circuits 63 to 65 in order to attain the magnification inputted from the command inputting portion 53. Further, the detecting portion 51 detects whether the magnification and the focal point in the image read by the CCD 9 are good or not. Then, the controlling portion 52 continues to issue the drive command to the driving circuits 63 to 65 till the focal point and the magnification reach the good state.

Next, the operation of the driving system constructed as shown in FIG. 7 will be explained.

To start with, a magnification setting command is inputted from the command inputting portion 53. When inputting this command, the driving circuit 63 is started in conformity with a command from the motor controlling portion 52 within the CPU 50. The lens driving motor 61 is thereby driven to move the lens on the optical axis. Simultaneously, the driving circuit 64 is actuated. The mirror driving motor 60 is thereby driven to move the mirror block 4 on the optical axis. The movement thereof is conducted in a coarse motion mode for coarsely determining the moving position to the predetermined position in accordance with the magnification. The actual machine involves the use of a stepping motor. A pulse speed of the motor for actualizing this coarse motion mode is set to, e.g., 2000 pps.

After this movement, the controlling portion 52 actuates the driving circuit 65 to drive the stage driving motor 62. The motor 62 moves the stage so that the focus and magnification detecting chart 41 is placed within the optical path. The detecting chart 41 is placed within the optical path, the light is emitted from the light source 1 and reflected by the chart 41. The thus reflected light passing through the mirror 3 and the mirror block 4 is incident on the lens 5 and thereafter forms an image on the CCD 9. This image is taken in the CCD 9 and transmitted to the CPU 50. The focus and magnification detecting portion of the CPU 50 judges whether the focus and the magnification are good or not.

If good, the variable magnification process is ended. Namely, the controlling portion 52 actuates the driving circuit 65 to drive the motor 62. The stage 2 is thereby moved to set the original document 10 within the optical path. Reading of the image of the original document is thus started.

If the focus and magnification are not good, the controlling portion 52 actuates the driving circuits 63, 64 to move the lens 5 and the mirror block 4 as well. In this case, the movements are conducted in a fine motion mode for finely shifting the positions. After the movements, the image is reread from the CCD 9, thereby judging the focal point and the magnification. The movements based on this fine motion mode are repeated till a judgement of goodness is obtained. In the actual machine, the pulse speed of the motor for actualizing this fine motion mode is set to, e.g., 500 pps.

Figure 8:
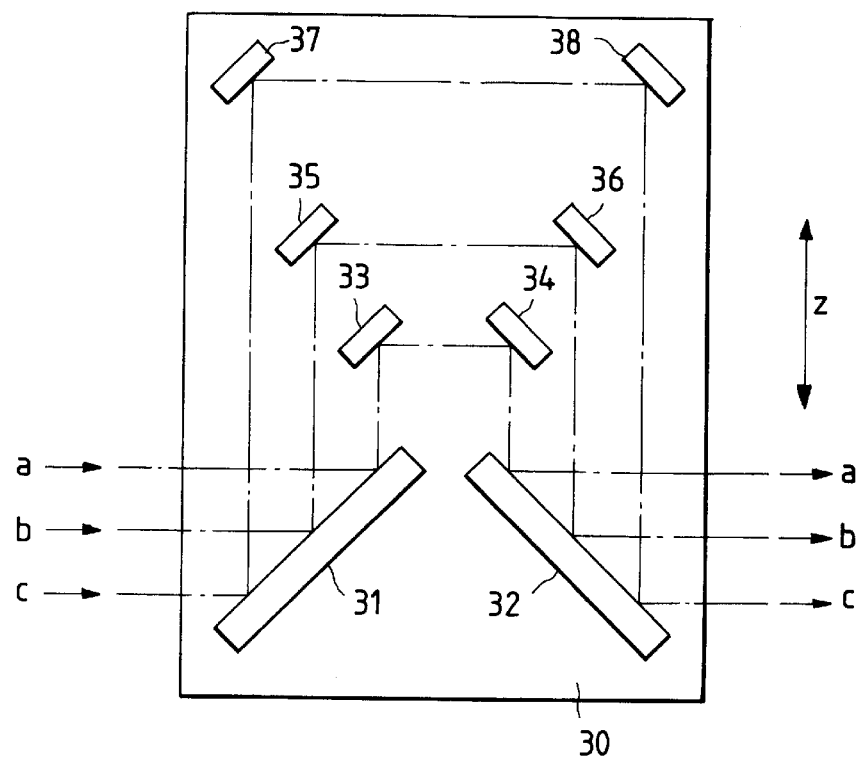
FIG. 8 is an explanatory diagram of a mechanism, installed in place of fixed mirrors 6, 8 and a mirror block 7 in FIG. 3, for changing a length of an optical path.

FIG. 8 is a view illustrating a mechanism, installed in place of the fixed mirrors 6, 8 and the mirror block 7, for changing a length of the optical path.

Referring to FIG. 8, mirrors 31 to 38 are fixed in a block 30. The mirrors 31, 33, 35, 37 among them are arranged in parallel with each other to gradually increase a distance from the mirror 31. An angle made by the mirrors 31, 32 is set at 90°. The mirrors 32, 34, 36, 38 are arranged to gradually increase a distance from the mirror 32. Note that the mirrors 33, 34, the mirrors 35, 36 and the mirrors 37, 38 are arranged in the same positions in the directions Z. This block 30 is moved in the directions Z to be set in three, i.e., lower, intermediate and upper positions.

The block 30 is thus set in the three positions, whereby the optical axis can be switched over to three stages a, b and c. When moving the block 30 downward, the optical axis becomes identical with a. In this instance, the light is reflected by the mirrors 31, 33, 34, 32, with the result that the length of the optical path is reduced. When moving the block 30 to the intermediate position, the optical axis becomes identical with b. The light is thereby reflected by the mirrors 31, 35, 36, 32. The length of the optical path is therefore longer than in the case of the optical axis a. When moving the block 30 to the upper position, the optical axis is identified with c. The light is reflected by the mirrors 31, 37, 38, 32. The length of the optical path is therefore longer than in the case of the optical axes a and b.

The magnification can be thus varied by changing the length of the optical path with a variation in the length of the deflecting portion of the optical path.

Figure 9:
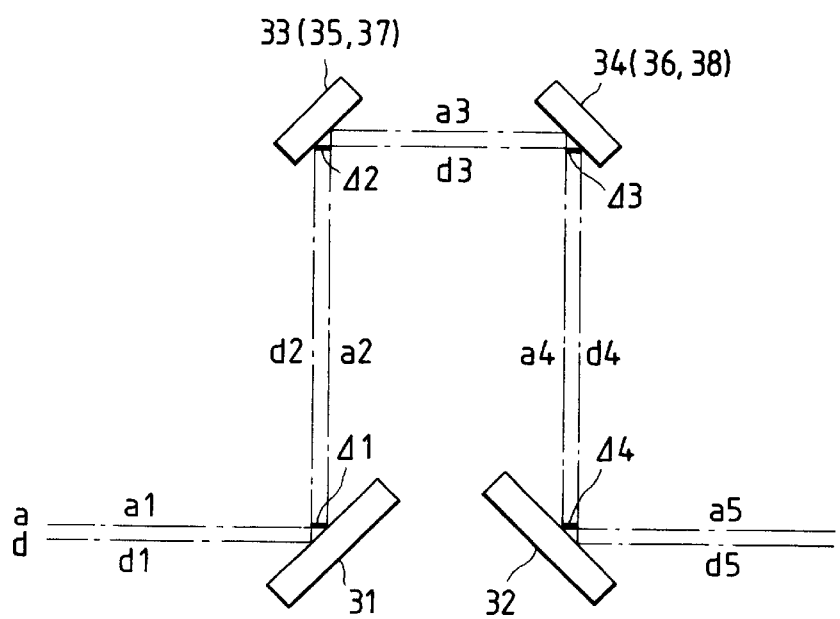
FIG. 9 is a explanatory diagram showing how a position of a block 30 shifts slightly in FIG. 8.

FIG. 9 shows a case where the position of the block 30 shifts slightly. When the optical axis shifts infinitesimally, the reflecting mirror does not change (in terms of number). For this reason, as illustrated in FIG. 9, the two optical axes a and b deviating infinitesimally from each other can be considered. The following is an explanation of the fact that the lengths of the optical paths are equal with respect to the optical axes a and d at this time.

To start with, the mirrors 31, 33 and a2, d2 are parallel with each other. Hence, a2 and d2 are equal to each other. Further, the mirrors 32, 34 and a4, d4 are parallel with each other. Hence, a4 and d4 are equal to each other. Besides, a1, d3 and a2, d2 are parallel with each other. Accordingly, Δ1, Δ2 and Δ3, Δ4 are equal to each other. Therefore, a length given by a1+a2+a3+a4+a5 is equal to a length given by d1+d2+d3+d4+d5. Therefore, the length of the optical path of the optical axis a is equalized to that of the optical axis d. Accordingly, when the position of the block 30 slightly shifts, the length of the optical path does not change.

Figure 10A:
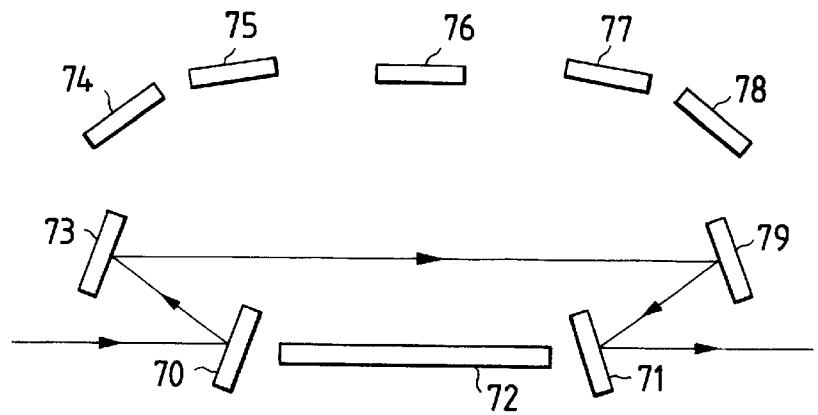
FIGS. 10A to 10C are explanatory diagrams each showing a modified example of a portion constructed of the mirrors 6, 8 and the mirror block 7 in FIG. 3.
Figure 10B:
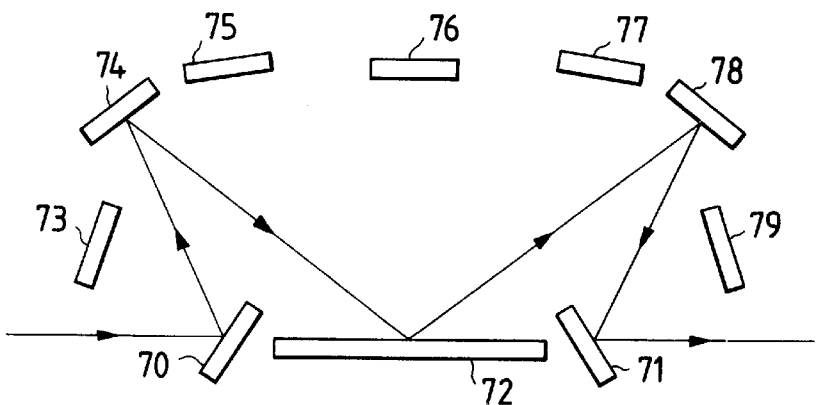
Figure 10C:
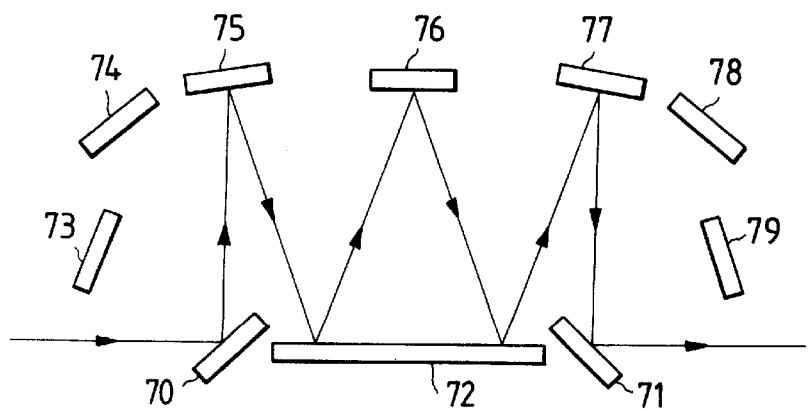

Next, FIGS. 10A through 10C show modified examples of the portion constructed of the mirrors 6, 8 and the mirror block 7 in the embodiment shown in FIG. 3. Movable mirrors 70, 71 and fixed mirrors 72 to 79 are prepared in place of the mirrors 6, 8 and the mirror block 7 shown in FIG. 3. The movable mirrors 70, 71, and the fixed mirror 72 are arranged in parallel with the optical axis of the outgoing light from the lens 5. The fixed mirrors 73 to 79 are arranged in a semi-circular shape to encircle the mirrors 70 to 72.

The movable mirrors 70, 71 are rotatably supported and disposed so that the rotating centers thereof are set on the optical axis of the outgoing light from the lens 5. The fixed mirror 72 is disposed so that the reflecting surface thereof is parallel with the optical axis described above.

An angle of the mirror 70 is selectable from three kinds of angles (the angles for reflections from the mirrors 73, 74 and 75). One angle is selected from three angles, thus setting an angle of the mirror 70. The light coming from the lens 5 is thereby incident on the mirror 70 and reflected by any one of the mirrors 73 to 75. As illustrated in FIG. 10A, when reflected by the mirror 73, the light is next reflected by the mirror 79. The mirror 71 is moved to make the light reflected by the mirror 79 incident on the movable mirror 71. Then, the mirror 71 reflects the light on the CCD 9. When the light is, as shown in FIG. 10B, reflected by the mirror 74, the light is next reflected by the mirror 72. The light reflected by the mirror 72 is then reflected by the mirror 78. The mirror 71 is moved so that the light reflected by the mirror 78 falls on the movable mirror 71. The mirror 71 reflects the light on the CCD 9. When the light is, as shown in FIG. 10C, reflected by the mirror 75, the light is next reflected by the mirror 72. The light is reflected by the mirror 76 and again reflected by the mirror 72. The light is thereafter reflected by the mirror 77. The mirror 71 is moved so that the light reflected by the mirror 77 is incident on the movable mirror 71. The mirror 71 reflects the light on the CCD 9.

In this manner, the angles of the mirrors 70, 71 are varied to change the length of the light deflecting portion of the optical path. The length of the optical path is thus changed, whereby the magnification is variable.

In accordance with the embodiment discussed above, an apparatus exhibiting a higher variable power rate can be obtained by employing a zoom lens instead of the fixed focusing lens 5. Further, the present invention is also applicable to an apparatus which uses not the reflected light from the original document (an object to be read) but the transmitted light.

As discussed above, according to the present invention, it is possible to provide a low-cost and small-size image reader incorporating the variable power function.

It is apparent that, in this invention, a wide range of different working modes can be formed based on the invention without deviating from the spirit and scope of the invention. This invention is not restricted by its specific working modes except being limited by the appended claims.

What is claimed is:

1. An image reader comprising:

a light source for irradiating an object whose image is to be read with light;

a reading sensor for reading the image;

a lens disposed on an optical path extending from said object to said reading sensor for forming on said reading sensor an image of light reflected by or penetrating said object;

plural groups of optical elements, each group of optical elements including a pair of light deflectors spaced apart by an optical distance that differs from that of each of the other pairs of light deflectors, each group forming a light deflecting optical path portion having a length that differs from the length of each of the other optical path portions; and a device for inserting a selected one of said light deflecting optical path portions, including a selected pair of light deflectors, into said optical path in order to change the length of said optical path, wherein said device includes a pair of light deflectors for deflecting light to one light deflector of a selected pair and for deflecting light received from the other deflector of the selected pair.

2. An image reader comprising:

a light source for irradiating an object whose image is to be read with light;

a reading sensor for reading the image;

a lens disposed on an optical path extending from said object to said reading sensor for forming on said reading sensor an image of light reflected by or penetrating said object;

plural groups of optical elements, each group of optical elements including a pair of light deflectors spaced apart by an optical distance that differs from that of each of the other pairs of light deflectors, each group forming a light deflecting optical path portion having a length that differs from the length of each of the other optical path portions; and a device for inserting a selected one of said light deflecting optical path portions into said optical path in order to change the length of said optical path, wherein said device moves said pairs of light deflectors as a unit in order to select one of said pairs for insertion in said optical path.

* * * * *